Patented Nov. 28, 1944

2,363,836

UNITED STATES PATENT OFFICE 2,363,836

PREPARATION OF HEAT-CONVERTIBLE, SOLUBLE, FUSIBLE POLYMERS OF DIVINYL BENZENE

Gaetano F. D'Alelio, Pittsfield, Mass., assignor to General Electric Company, a corporation of New York No Drawing. Application June 23, 1942,
Serial No. 448,158

2 Claims. (Cl. 260—91)

This invention relates to the preparation of synthetic resin compositions and more particularly to the preparation of heat-convertible, soluble, fusible polymers of divinyl benzene.

It is known that polymerization of compounds possessing more than one terminal

grouping, providing the system is not conjugated, results in the formation of a cross-linked insoluble, infusible polymer. Examples of such compounds are glycol dimethacrylate, diallyl succinate, diallyl phthalate, diallyl maleate, allyl acrylate, diallyl oxalate, dimethyllyl ether, etc. Divinyl benzene polymerized in the usual manner acts in the same fashion. When this compound is polymerized, an insoluble, very hard, infusible, non-workable mass is obtained.

I have now discovered that divinyl benzene may be partially polymerized to a soluble and fusible, heat-convertible mass, thus making available for commercial use a product heretofore inapplicable. The process by which a soluble, fusible partial polymer of divinyl benzene may be isolated from a dialkyl benzene having at least two carbons in each alkyl grouping comprises polymerizing the solution of divinyl benzene in a dialkyl benzene in the presence of both an inhibitor and a catalyst of polymerization for a time less than that required to cause separation of the polymer. The dissolved partial polymer is then precipitated by the addition of a non-solvent or by evaporation of the volatile constituents.

Present production of divinyl benzene (monomer) is carried out in such a manner that the resulting product is an inseparable mixture of about 20–30% divinyl benzene in diethyl benzene. The present invention is of special interest because it utilizes this inseparable mixture for which there has been no use up until the present time.

Extensive experiments carried out on the polymerization of divinyl benzene in a dialkyl benzene indicate that an insoluble, infusible resin is obtained as a gel when ordinary polymerization methods are employed. This gel formation or precipitation takes place in a very short time, e. g., 15–20 minutes. The extreme sensitivity of this resin precludes its use in industrial applications. By means of this invention, I may cause the polymer to be formed at a much slower rate, thus providing a greater permissible deviation from any calculated time required to give a maximum yield of partial polymer. The time required depends upon the type as well as the amount of inhibitor and catalyst present in the solution. I have found that, by varying my conditions a partially polymerized product may be obtained in as little as 30 minutes. The actual polymerization of the divinyl benzene from its solution in a dialkyl benzene is carried out as previously indicated in the presence of both a catalyst and an inhibitor of polymerization. This is surprising since it would not be expected that two classes of materials, one the class of inhibitors, the other the class of polymerization catalysts, could be used simultaneously to produce the soluble, fusible, heat-convertible polymers of divinyl benzene.

Any suitable method may be employed. However, I prefer to cause polymerization under the influence of external heat in the presence of an inhibitor and catalyst for a period substantially less than that required to cause gelation of the solution. For purposes of economy and convenience I prefer to use reflux temperature and atmospheric pressure although other elevated temperatures and pressures ranging from subatmospheric to superatmospheric pressure may be used. The partial polymer of divinyl benzene may be precipitated from the dialkyl benzene by the addition of some non-solvent, e. g., methyl alcohol, ethyl alcohol, glycol, etc.

For polymerization catalysts in the polymerization of divinyl benzene I may use ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., ketone peroxides, e. g., acetone peroxide, triacetone peroxide, alkyl derivatives of hydrogen peroxide, e. g., ethyl hydrogen peroxide, diethyl peroxide, etc., mixed organic peroxides, e. g., acetyl benzoyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids, as for instance, cobalt and manganese resinates, linoleates, maleates, etc., hydrogen peroxide, etc. However, benzoyl peroxide is a preferred catalyst. Any suitable amount of catalyst may be used but, in general, the catalyst concentration will be within the range of 0.1–2.0% by weight of divinyl benzene.

As is seen in the following examples, whereas the divinyl benzene in the absence of copper gelled in 17 minutes to give a gelled and non-satisfactory product, the same composition, when it contained copper, could be polymerized for a period of 30 minutes. Even at that time a heat-convertible, soluble, fusible polymer was isolated.

In order that those skilled in the art may better understand my invention, the following examples are given by way of illustration. All parts are by weight.

*Example 1*

| | Parts by weight |
|---|---|
| Divinyl benzene (212 parts 23% solution in diethyl benzene) | 48.8 |
| Copper gauze (2 sq. in. of freshly reduced copper) | |
| Benzoyl peroxide | 0.5 |

The above ingredients were heated at the boiling temperature of the reacting ingredients for 30 minutes. At the end of this time the viscous solution was poured into methanol. The partial polymer separated by precipitation. It was then triturated, dried and ground. This product was easily fusible at the temperatures of the hot plate, e. g., 140° C.

*Example 2*

| | Parts by weight |
|---|---|
| Divinyl benzene (217 parts 23% solution in diethyl benzene) | 50 |
| Benzoyl peroxide | 0.5 |

The above ingredients were heated to reflux and the whole mass gelled in 17 minutes.

Besides copper there may be used as the inhibitor, any known inhibitor for

compounds, such as sulfur, the aromatic primary or secondary amines such as aniline, diphenyl amine, naphthyl amine, the hydroxy aryl compounds, such as the phenols, cresols, xylenols, naphthols, etc., or mixed compounds such as the aminophenols, the amino naphthols, etc., may be used alone or in conjunction with each other or with copper. The term inhibitor embraces such compounds as these within its meaning.

What I claim as new and desire to secure by Letters Patent of the United States is:

1. The process of preparing a heat-convertible, fusible polymer of divinyl benzene which comprises, polymerizing a solution of divinyl benzene in a dialkyl benzene having at least two carbon atoms in each alkyl grouping in the presence of both an added inhibitor consisting of copper and an added polymerization catalyst, for a period substantially less than required to cause gellation, and isolating the partially polymerized product.

2. A process as in claim 1 wherein the added polymerization catalyst is benzoyl peroxide.

GAETANO F. D'ALELIO.